United States Patent [19]

Watanabe et al.

[11] 4,421,086
[45] Dec. 20, 1983

[54] IGNITION TIMING CONTROL SYSTEM FOR AN ENGINE

[75] Inventors: Tomoyuki Watanabe; Takashi Shigematsu, both of Shizuoka, Japan

[73] Assignee: Toyota Jidosha Kogyo Kabushiki Kaisha, Toyota, Japan

[21] Appl. No.: 229,264

[22] Filed: Jan. 28, 1981

[30] Foreign Application Priority Data

Feb. 1, 1980 [JP] Japan .................................. 55-11636

[51] Int. Cl.³ .................................................. F02P 5/04
[52] U.S. Cl. .................................... 123/425; 123/435
[58] Field of Search ................ 123/419, 422, 425, 426, 123/494, 436, 435

[56] References Cited

U.S. PATENT DOCUMENTS

| | | | |
|---|---|---|---|
| 3,587,764 | 6/1971 | Bowles | 123/422 |
| 3,596,643 | 8/1972 | Schweitzer | 123/419 |
| 3,897,766 | 8/1975 | Prah | 123/426 |
| 4,012,942 | 3/1977 | Harned | 123/425 |
| 4,026,251 | 5/1977 | Schweitzer | 123/419 |
| 4,236,491 | 12/1980 | Hattori et al. | 123/425 |
| 4,242,995 | 1/1981 | Schramm | 123/425 |
| 4,257,364 | 3/1981 | Sawada et al. | 123/425 |
| 4,257,373 | 3/1981 | McDougal et al. | 123/425 |
| 4,276,861 | 7/1981 | Kearney et al. | 123/425 |
| 4,282,841 | 8/1981 | Takagi et al. | 123/425 |
| 4,300,503 | 11/1981 | Deleris et al. | 123/425 |
| 4,331,117 | 5/1982 | Ginsburgh | 123/425 |

Primary Examiner—Donald B. Cox
Attorney, Agent, or Firm—Cushman, Darby & Cushman

[57] ABSTRACT

Ignition timing is changed within a predetermined range at a slow frequency and the fluctuations in vibrations of the engine block at that slow frequency are detected. By monitoring the phase of the vibrations with the phase of the slow frequency, whether the timing is on the advanced side or delayed side with respect to the optimum ignition timing can be determined. Ignition timing is controlled based on the result of the determination so that the ignition timing can approach the optimum ignition timing. As a result, shifts from the optimum ignition timing can be reliably corrected, so that the engine always operates at the best condition.

8 Claims, 6 Drawing Figures

FIG. 2
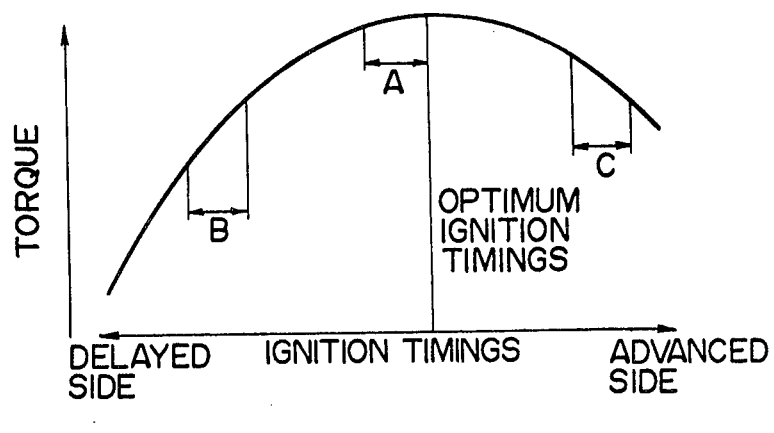
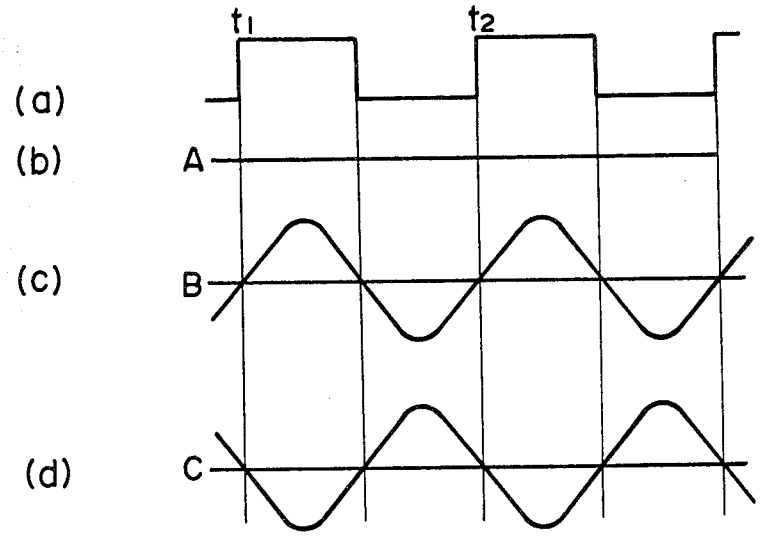

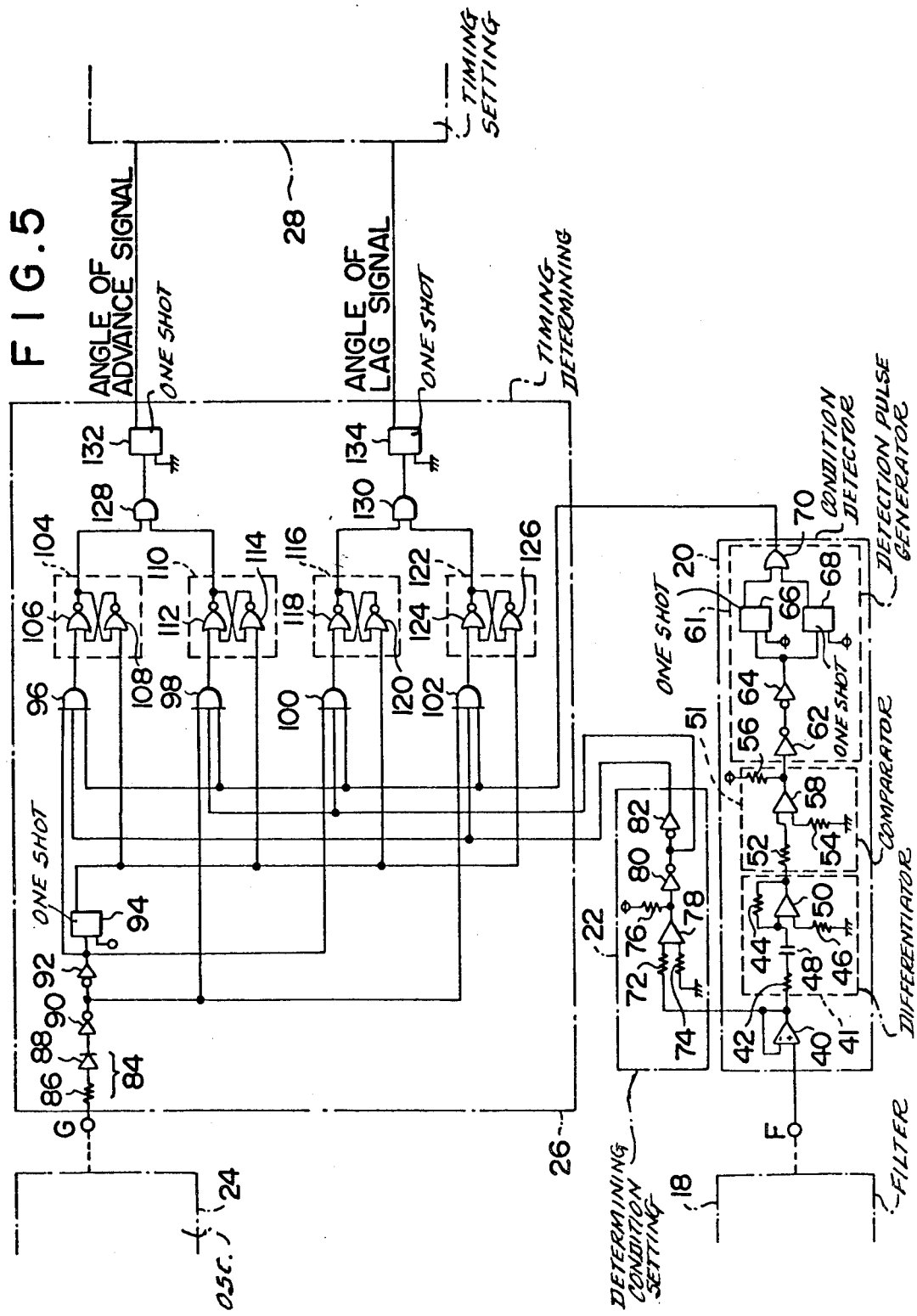

IGNITION TIMING CONTROL SYSTEM FOR AN ENGINE

BACKGROUND OF THE INVENTION

1. Field of the Invention

The present invention relates to a method of controlling the ignition timing of an engine and a system therefor. More particularly, this invention relates to a method of and system for controlling the ignition timing of a spark ignition type engine (hereinafter referred to as an "engine") mounted on a motor car and capable of to an optimum value in accordance with the operating condition of the engine.

2. Description of the Prior Art

In general, the ignition timing of an engine renders considerable effects to the output, fuel consumption and the like of the engine. Consequently, heretofore, the operating conditions of the engine, such as the rotational speed, and negative pressure in an air intake pipe, are detected and at the optimum timing predetermined in accordance with the values thus detected. Furthermore, as for other control factors such as the exhaust gas recirculation rate, cooling water temperature and the like, corrections have been made to the ignition timing commensurate with the values detected so as to optimize ignition timing. However, this method is disadvantages that the effects of atmospheric pressure, ambient temperature and other temperatures cannot be corrected for, without the addition of a multiplicity of sensors to detect all these factors. Further, optimum ignition timing change due to factors difficult to detect, such as changes with time due to mechanical wear of the engine, changes in the quality of fuel and the like. With the prior art ignition timing control method, it has been difficult to optimize ignition timing in view of the above-described factors. Consequently, losses in fuel consumption and output have been expected from the undetectable disturbances. For example, FIG. 1 shows the relationship between the humidity and optimum ignition timing. The optimum ignition timing varies up to a crank angle of 7°–8° depending upon the ambient conditions during use, and performance deteriorates therefrom. Furthermore, with respect to changes with time, the optimum ignition timing may vary by a crank angle of 15°–20° from the initial optimum ignition timing in accordance with the initial operating condition of the engine and the standard atmospheric condition, and a loss in fuel consumption up to about 10–20% has been expected therefrom. However, heretofore, there has been no countermeasure to eliminate the loss.

It has been proposed to detect fluctuations in torque from an output of an alternator or from acceleration in the rotational speed of the engine, whereby the ignition timings are feedback-controlled, as shown in U.S. Pat. No. 3,142,967. However, a sensor for detecting torque fluctuations from the alternator or an output shaft of the engine becomes complicated in arrangement, thus causing lowered reliability to the sensor.

Additionally, the ignition timing may be controlled in accordance with the amplitudes of the vibrations of the engine block caused by the fluctuation in torque of the output shaft or rotational vibrations about the output shaft. However, the operating condition of the engine and the external noises, such as vibrations of the vehicle, may render adverse effects to the method and the system therefor.

SUMMARY OF THE INVENTION

Accordingly, it is a general object of present invention to provide a system for controlling ignition timing in an engine, wherein no adverse effects are rendered by the external noises, and, even under abnormal conditions, if the optimum ignition timing varies due to unknown fluctuation factors such as changes in the ambient conditions of the engine, changes over time and the like, the ignition timing can be automatically controlled so that the engine performs optimally.

The present invention achieves the abovedescribed object by providing an ignition timing control system in an engine including an ignition timing changing circuit for periodically advancing or delaying the ignition timing of the engine with respect to the preset ignition timing within a predetermined range, the periodic changing occurring at a predetermined frequency. An engine vibration detector detects vibrations caused by fluctuations in torque of an output shaft and rotational vibrations about the output shaft. An ignition timing determining circuit determines from differences in phase between an output from the engine vibration detector at the predetermined frequency and an output from the ignition timing changing circuit whether the preset ignition timing is advanced or delayed with respect to the optimum ignition timing. In response to an output from said ignition timing determining circuit, the preset ignition timing is changed in a direction approaching the optimum ignition timing.

BRIEF DESCRIPTION OF THE DRAWINGS

FIG. 2 is a chart showing the principles of the present invention, in which the relationship between the ignition timings and the torque of the output shaft is illustrated;

FIG. 5 is an electric circuit arrangement diagram showing specific examples of the essential portions in the above-described embodiment.

DETAILED DESCRIPTION OF THE INVENTION

FIG. 2 shows the principles of the present invention. Now, the phases in torque fluctuation in the output shaft against the changes in the ignition timings (see FIG. 2(*a*)) are different as shown by FIGS. 2(*b*), 2(*c*) and 2(*d*), respectively, in the case A that the ignition timings of the engine range in proximity of the optimum ignition timings, in the case B that the ignition timings range at the delayed side relative to the optimum ignition timings, or in the case C that the ignition timings range at the advanced side relative to the optimum ignition timings. More specifically, in the case B that the ignition timings are fluctuated at the delayed side relative to the optimum ignition timings, the torque fluctuation begins from a positive region and ends at a negative region during one cycle of a fluctuation cycle of $t_1$-$t_2$. On the other hand, in the case C that the ignition timings are fluctuated at the advanced side relative to the optimum ignition timings, the phase is reversed to the above. These phases are independent of the negative pressure of intake air and changes in the atmospheric pressure. Consequently, if this difference in phase is utilized, the ignition timings can be optimally controlled.

Figure 3:
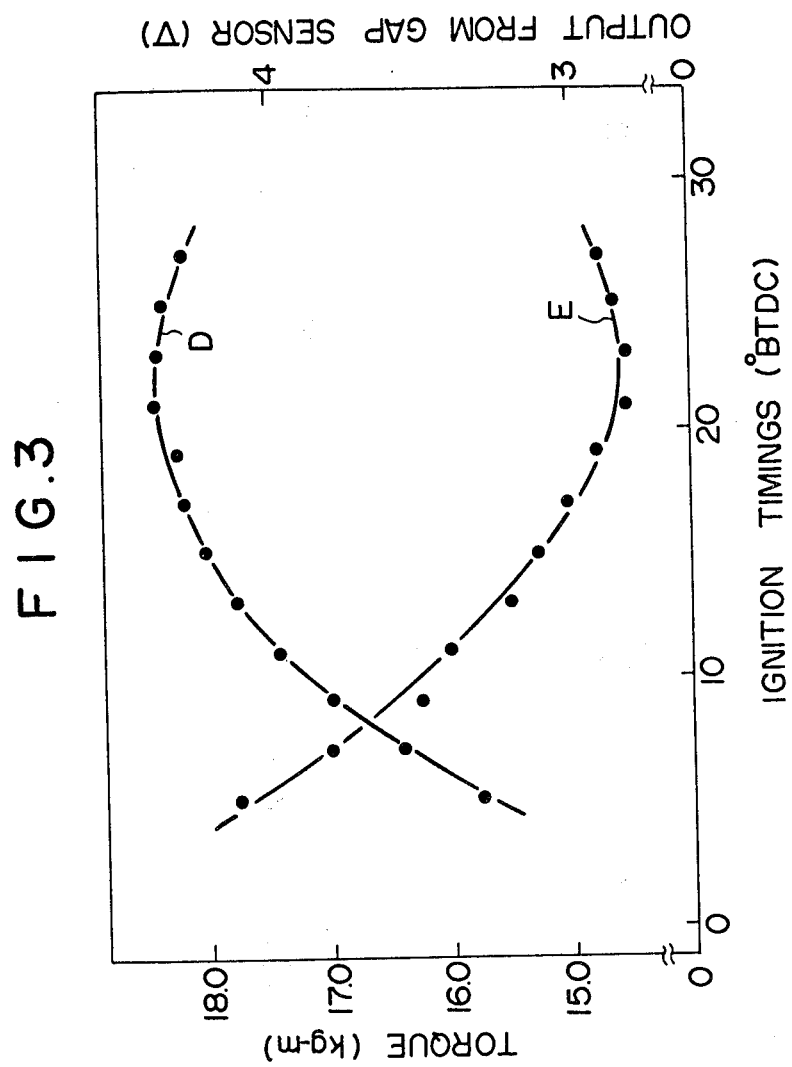
FIG. 3 is a chart also showing the principles of the present invention, in which the relationship between the ignition timings, the torque of the output shaft and the displacement of the vibrations of the engine block is illustrated.

As the means of detecting the optimum ignition timings, it is possible to directly detect the torque fluctuation of the output shaft. However, as shown in FIG. 3, since there exists a strong interrelation between the torque (indicated by a solid line D) of the output shaft and the output (indicated by a solid line E) from the gap sensor for example, which detects the displacement of vibrations of the engine block caused by the rotational vibrations about the output shaft, it is possible to detect the torque fluctuation from the vibrations of the engine block detected by the gap sensor or the like.

Figure 1:
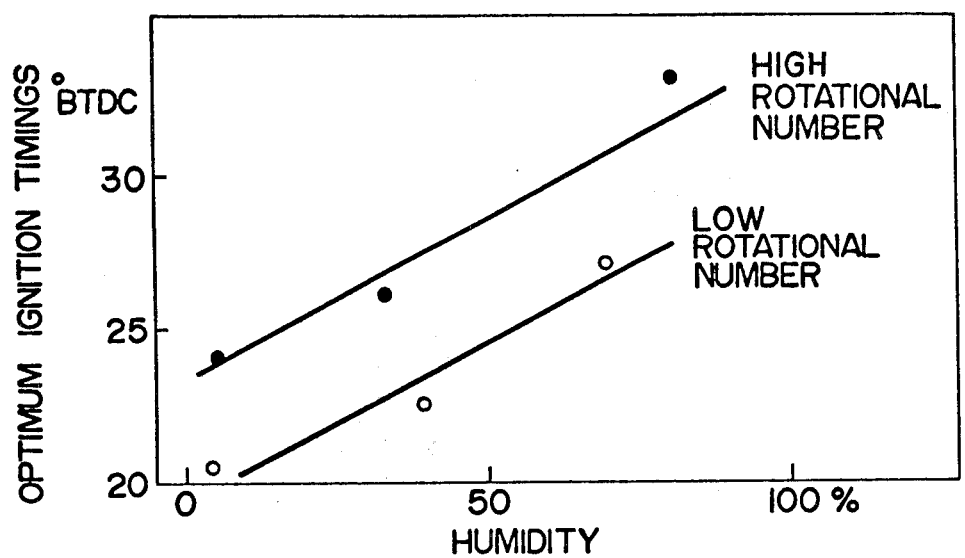
FIG. 1 is a chart showing the relationship between the ambient condition (humidity) of the engine and the optimum ignition timings.
Figure 4:
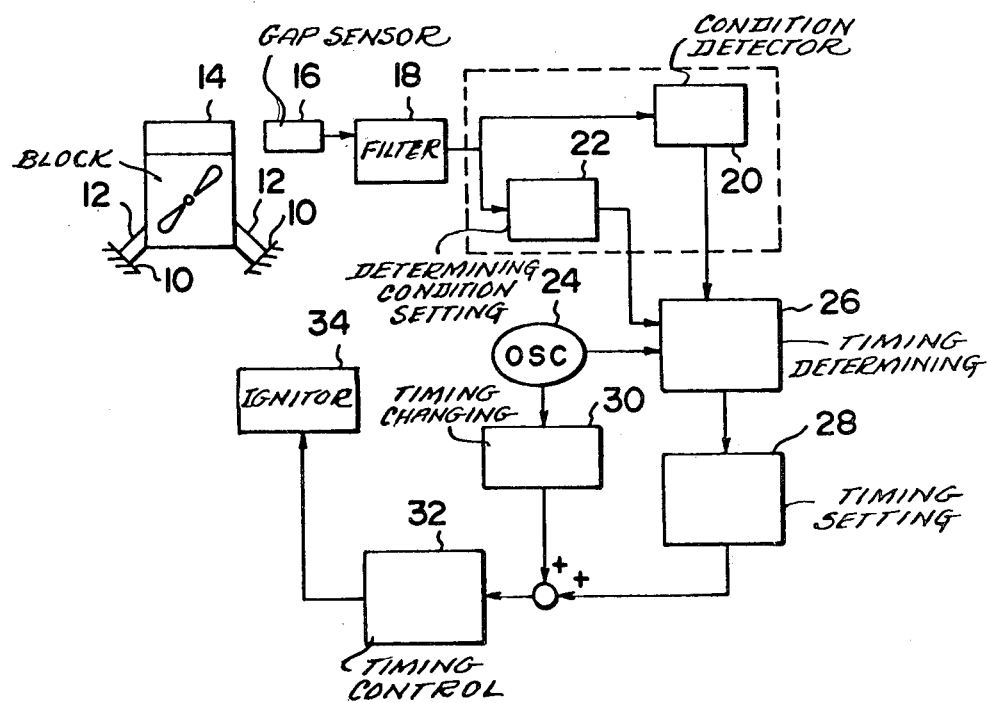
FIG. 4 is a block diagram showing the general arrangement of an embodiment of the ignition timing control system in an engine according to the present invention.

Detailed description will hereunder be given of an embodiment of the present invention with reference to the drawings. As shown in FIG. 4, a system of this embodiment includes:

a gap sensor 16 provided adjacent an engine block 14 supported on a vehicle body 10 through vibration isolating rubbers 12 and the like for detecting the displacement of vibrations of the engine block 14 caused by the rotational vibrations about an output shaft;

a narrow region filter 18 for extracting only the necessary frequencies such as signals in proximity of 1 $H_z$ from outputs supplied from the gap sensor 16;

an engine condition detecting circuit 20 for detecting the condition of the engine from an output supplied from the filter 18;

a determining condition setting circuit 22 for setting conditions for determining the condition of the engine;

an oscillator 24 for oscillating periodic signals of about 1 $H_z$ for changing the ignition timings of the engine, and different from the disturbance of the vehicle vibrations being of normally 3 $H_z$ and more;

an ignition timing determining circuit 26 for determining from condition signals supplied from the determining condition setting circuit 22 in accordance with the cycles of the oscillator 24 at which side the preset ignition timings are present, the advanced side or delayed side with respect to the optimum ignition timings;

an ignition timing setting circuit 28 for changing the preset ignition timings in response to an output from the ignition timing determining circuit 26;

an ignition timing changing circuit 30 for emitting a signal to advance or delay the ignition timings from the center of the preset ignition timings in proper cycles by the predetermined values such as a crank angle of ±1.5° in the advanced or delayed side in response to an output from the oscillator 24;

an ignition timing control circuit 32 for controlling an ignitor 34 to actually control the ignition timings in response to output signals from the ignition timing changing circuit 30 and the ignition timing setting circuit 28; and an ignitor 34 having a switching circuit for ON-OFF operating the primary current of the ignition coil in response to an output signal from the ignition timing control circuit 32.

As detailedly shown in FIG. 5, the engine condition detecting circuit 20 includes:

a buffer circuit consisting of an operational amplifier 40 to which an output is fed from the filter 18 through a terminal F;

a differentiation circuit 41 consisting of resistances 42,44,46, a capacitor 48 and an operational amplifier 50 and to which an output from the buffer circuit is fed;

a comparison circuit 51 consisting of resistances 52,54,56 and an operational amplifier 58 and to which an output from the differentiation circuit 41 is fed; and a detection pulse generating circuit 61 consisting of NOT gates 62, 64, monostable circuits 66, 68 and an OR gates 70 and to which an output from the comparison circuit 51 is fed.

Also as detailedly shown in FIG. 5, the determining condition setting circuit 22 includes: resistances 72,74 and 76; an operational amplifier 78; and two NOT gates 80 and 82. The resistance 72 of this determining condition setting circuit 22 is fed with an output from the operational amplifier 40 of the engine condition detecting circuit 20.

Also as detailedly shown in FIG. 5, the ignition timing determining circuit 26 includes:

a waveshape process circuit 84 consisting of a resistance 86 and a diode 88 and to which an output from the oscillator 24 is fed through a terminal G;

a NOT gate 90 to which an output from the waveshape process circuit 84 is fed;

a NOT gate 92 for inverting an output from the NOT gate 90;

A monostable circuit 94 to which an output from the NOT gate 92 is fed;

a three-input AND gate 96 to which are fed an output from the NOT gate 92, an output from the NOT gate 82 of the determining condition setting circuit 22 and an output from the engine condition detecting circuit 20;

a three-input AND gate 98 to which are fed an output from the NOT gate 90, an output from the NOT gate 80 of the determining condition setting circuit 22 and an output from the engine condition detecting circuit 20;

a three-input AND gate 100 to which are fed an output from the NOT gate 92, an output from the NOT gate 80 of the determining condition setting circuit 22 and an output from the engine condition detecting circuit 20;

a three-input AND gate 102 to which are fed an output from the NOT gate 90, an output from the NOT gate 82 of the determining condition setting circuit 22 and an output from the engine condition detecting circuit 20;

an R-S flipflop 104 consisting of two NOR gates 106 and 108, one NOR gate 106 being fed with an output from the three-input AND gate 96 and the other NOR gate 108 being fed with an output from the monostable circuit 94;

an R-S flipflop 110 consisting of two NOR gates 112 and 114, one NOR gate 112 being fed with an output from the three-input AND gate 98 and the other NOR gate 114 being fed with an output from the monostable circuit 94;

an R-S flipflop 116 consisting of two NOR gates 118 and 120, one NOR gate 118 being fed with an output from the three-input AND gate 100 and the other NOR gate 120 being fed with an output from the monostable circuit 94;

an R-S flipflop 122 consisting of two NOR gates 124 and 126, one NOR gate 124 being fed with an output from the three-input AND gate 102 and the other NOR gate 126 being fed with an output from the monostable circuit 94;

an AND gate 128 to which are fed outputs from the R-S flipflops 104 and 110;

an AND gate 130 to which are fed with outputs from the R-S flipflops 116 and 122;

a monostable circuit 132 to which an output from the AND gate 128 is fed; and a monostable circuit 134 to which an output from the AND gate 130 is fed. Outputs from the monostable circuits 132 and 134 are fed to the ignition timing setting circuit 28 as the angle of advance and angle of lag, respectively.

Figure 6:
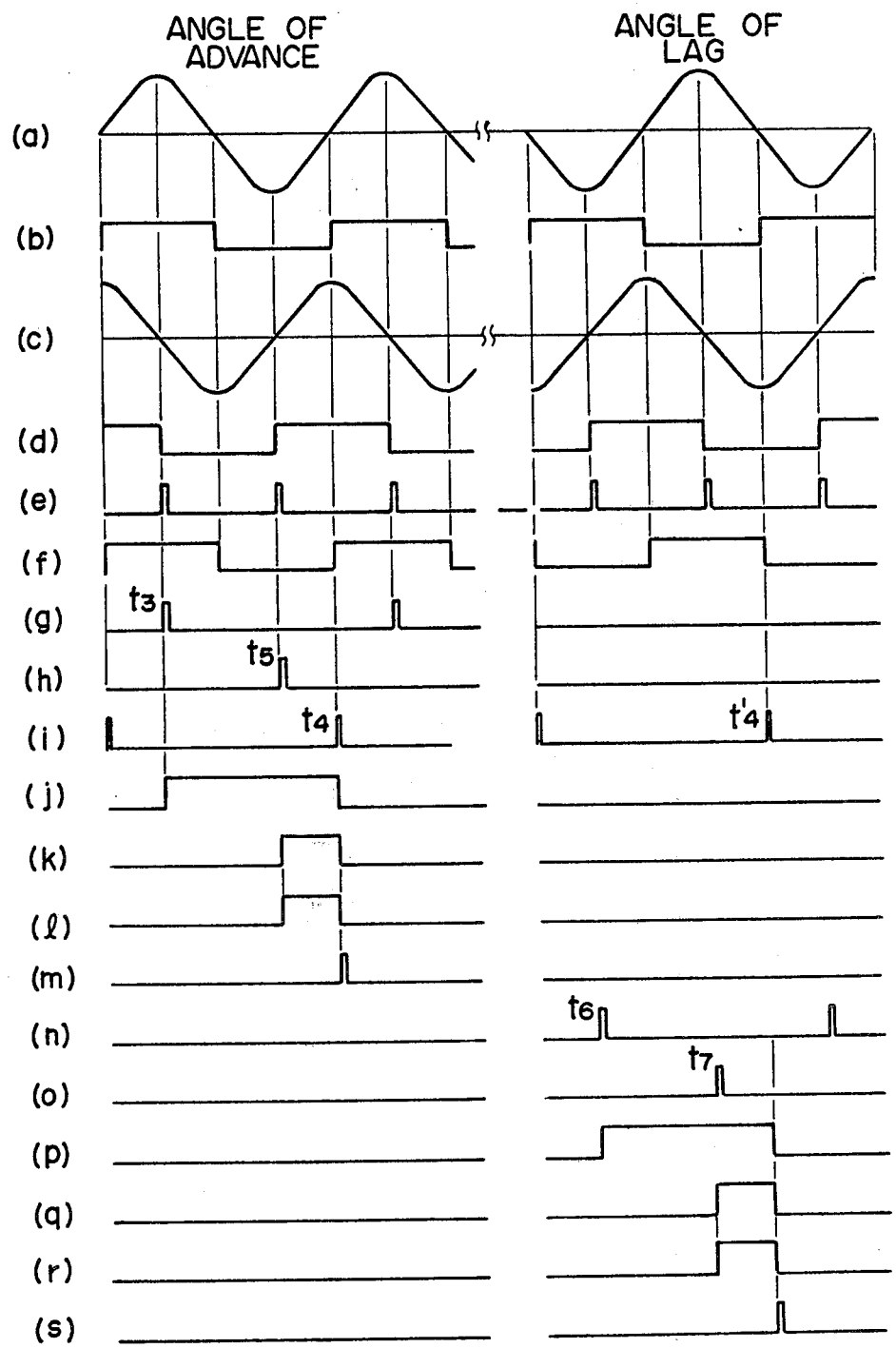
FIG. 6 is a chart showing the waveshapes of actions in the various components in the above-described embodiment.

Description will hereunder be given of action with reference to FIG. 6. In the drawing, the left side shows the case of being advanced and the right side the case of being delayed. FIGS. 6(a) and 6(b) show the outputs from the filter 18 and the oscillator 24, respectively. In order to detect the engine condition from a waveshape peak value emitted from the filter 18 for one cycle from the rise of an output from the oscillator 24, an output from the filter 18 is differentiated in the differentiation circuit 41 through the buffer circuit consisting of the operational amplifier 40, thereby obtaining a result shown in FIG. 6(c). The output thus differentiated is set at H level in the comparison circuit 51 when it is larger in value than O(V) and set at L level when it is smaller in value than O(V) (See FIG. 6(d)). In the detection pulse generating circuit 61, an output from this comparison circuit 51 actuates the monostable circuits 66 and 68 at the rise or fall of an output thereof, respectively, to thereby generate detection pulses (See FIG. 6(e)). By this, the detection pulses are generated to the waveshape peak values fed from the filter 18. These detection pulses are fed to the ignition timing determining circuit 26 to determine in what conditions the preset ignition timings are with respect to the optimum ignition timings. Furthermore, an output from the buffer circuit consisting of the operational amplifier 40 is fed to the determining condition setting circuit 22 also. Here, as shown in FIG. 6(f), the output from the buffer circuit is set at H level when it is larger in value than O(V), and set at L level when it is smaller than O(V). As apparent from FIGS. 6(b), 6(f) and 6(e), three-input AND gate 96 of the ignition timing determining circuit 26 emits a detection pulse as shown in FIG. 6(g) when an output from the oscillator 24 is of a half cycle of H level and an output from the determining condition setting circuit 22 is of H level. Also, as apparent from FIGS. 6(b), 6(f) and 6(e), the three-input AND gate 98 emits a detection pulse as shown in FIG. 6(h) when an output from the oscillator 24 is of half cycle of L level and an output from the determining condition setting circuit 22 is of L level. In the R-S flipflop 104, a signal is emitted as shown in FIG. 6(j) which becomes H level at the rise $t_3$ of a pulse fed from the three-input AND gate 96 or becomes L level at the rise ($t_4$ in FIG. 6(i)) of a pulse fed from the monostable circuit 94. Furthermore, in the R-S flipflop 110, a signal is emitted as shown in FIG. 6(k) which becomes H level at the rise $t_5$ of a pulse fed from the three-input AND gate 98 or becomes L level at the rise $t_4$ of a pulse fed from the monostable circuit 94. The AND gate 128 is fed with outputs from the R-S flipflops 104 and 110, and, when both outputs are of H level, emits an output as shown in FIG. 6(l). As shown in FIG. 6(m), the monostable circuit 132 emits a pulse at the fall $t_4$ of an output from the AND gate 128. The pulse from the monostable circuit 132 is fed to the ignition timing setting circuit 28 as the signal for advancing the preset ignition timings.

As apparent from FIGS. 6(b), 6(f) and 6(e), the three-input AND gate 100 emits a detection pulse as shown in FIG. 6(n) when an output from the oscillator 24 is of a half cycle of H level and an output from the determining condition setting circuit 22 is of L level. As apparent from FIGS. 6(b), 6(f) and 6(e), the three-input AND gate 102 emits a detection pulse as shown in FIG. 6(o) when an output from the oscillator 24 is of a half cycle of L level and an output from the determining condition setting circuit 22 is of H level. As shown in FIG. 6(p), in the R-S flipflop 116, a signal is emitted which becomes H level at the rise $t_6$ of a pulse from the three-input AND gate 100 or becomes L level at the rise $t_4'$ of a pulse from the monostable circuit 94. Furthermore, as shown in FIG. 6(q), in the R-S flipflop 122, a signal is emitted which becomes H level at the rise $t_7$ of a pulse from the three-input AND gate 102 or becomes L level at the rise $t_4'$ of a pulse from the monostable circuit 94. The AND gate 130 is fed with outputs from the R-S flipflops 116 and 122, and, when both outputs are of H level emits an output as shown in FIG. 6(r). As shown in FIG. 6(s), the monostable circuit 134 emits a pulse at the fall $t_4'$ of an output from the AND gate 130. A pulse from the monostable circuit 134 is fed to the ignition timing setting circuit 28 as the signal for delaying the preset ignition timings.

As described above, in response to a signal fed from the ignition timing determining circuit 26, the ignition timing setting circuit 28 drives an updown counter, not shown, and the ignition timings are set in response to an output from the updown counter. For example, when an advance signal is fed from the ignition timing determining circuit 26, the counter is down-counted by one step to advance the ignition timings by the predetermined values ahead of the preceding ignition timings, and conversely, when a lag signal is fed from the ignition timing determining circuit 26, the counter is up-counted by one step to delay the ignition timings by the predetermined values behind the preceding ignition timings. Further, an output from the ignition timing setting circuit 28 is combined with an output from the ignition timing changing circuit 30, whereby the ignition timing control circuit 32 controls the ignitor 34 in such a manner that the actual ignition timings are changed by ±1.5° from the center of the corrected ignition timings for example.

In addition, in the abovedescribed embodiment, the vibrations of the engine block are detected through the displacement thereof by use of the gap sensor. However, means for detecting the vibrations of the engine block is not limited to this, but, needless to say that it is possible for this purpose to detect the acceleration by use of an acceleration sensor.

Furthermore, in the abovedescribed embodiment, the ignition timings are advanced or delayed by ±1.5° from the center of the preset ignition timings. However, the changing width and changing method of the ignition timings are not limited to these as far as they can detect a difference in torque, but the ignition timings can be delayed by +3° with the preset ignition timings being as the upper limit.

As has been described hereinabove, according to the present invention, no adverse effects are rendered by the external noises, even in the abnormal operating condition, shifts in the optimum ignition timings due to changes with time can be reliably corrected, so that such an outstanding advantage can be offered that the engine can be operated constantly in the best condition.

What is claimed is:

1. An ignition timing control system in an internal combustion engine, comprising:

ignition timing changing means for emitting a signal to alternately advance and delay ignition timing from a reference ignition timing at a predetermined frequency in response to a periodic signal;

engine vibration detecting means for detecting vibration of said engine and emitting a vibration signal;

ignition timing determining means, responsive to said periodic signal and said vibration signal, for monitoring said vibration signal in a frequency zone substantially equal to said predetermined frequency, and emitting a lag angle signal to delay the ignition timing when said periodic signal and said vibration signal have a first phase relationship, and for emitting an advance angle signal when said periodic signal and said vibration signal have a second phase relationship; and ignition timing controlling means for adjusting said reference ignition timing in response to an output of said ignition timing determining means so that said vibrations of the engine can be decreased, and controlling the ignition timing in response to an output signal from said ignition timing changing means so that the ignition timing can be changed at the predetermined frequency.

2. An ignition timing control system for an internal combustion engine, comprising:

oscillating means for emitting a first periodic signal having a first frequency;

ignition timing changing means, responsive to said oscillating means, for emitting an ignition timing changing signal to periodically change a reference ignition timing by a predetermined value so as to vibrate an engine block at said first frequency;

engine vibration detecting means for detecting vibrations of said engine block and emitting electric signals commensurate to the vibrations;

filter means for allowing to pass therethrough an electric signal having said first frequency out of said electric signals;

determining condition setting means for emitting a second signal having a high level when the amplitude of said electric signal having passed through said filter means is positive, and for emitting a second signal having a low level when the amplitude of said electric signal having passed through said filter means is negative;

ignition timing detecting means for emitting a lag angle signal at a rate of one pulse per cycle of said electric signals having passed through said filter means when said first signal is on the high level and said second signal is on the high level, and for emitting an advance angle signal at a rate of one pulse per cycle of said electric signals having passed through said filter means when said first signal is on the high level and said second signal is on the low level;

ignition timing setting means for counting pulses of said lag angle signals and said advance angle signals, and emitting, in response to said counting, an ignition timing correction signal for correcting the reference ignition timing; and ignition timing control means for adjusting said reference ignition timing in response to an output of said ignition timing setting means so that said vibrations of the engine can be decreased, and controlling the ignition timing in response to an output signal from said ignition timing changing means so that the ignition timing can be changed by the predetermined frequency.

3. An ignition timing control system as set forth in claim 1, further comprising:

oscillating means for generating said periodic signal and applying said periodic signal to said ignition timing changing means and said ignition timing determining means.

4. An ignition timing control system as set forth in claim 1, further comprising:

filter means for allowing to pass therethrough only a signal having said predetermined frequency out of said vibration signals emitted from said engine vibration detecting means.

5. An ignition timing control system as set forth in claim 3, further comprising:

filter means for allowing to pass therethrough only a signal having said predetermined frequency out of said vibration signals emitted from said engine vibration detecting means.

6. An ignition timing control system as set forth in claim 2, further comprising:

engine condition detecting means for emitting peak signals having one pulse per each peak in waveform of said electric signals having passed said filter means, said ignition timing detecting means determining one cycle of said electric signals by said peak signals.

7. An ignition timing control system as set forth in claim 6, wherein ignition timing detecting means comprises:

a first monostable circuit for emitting a rising signal having one pulse in accordance with a rising edge of said first signal;

a first three-input "AND" circuit to which said first signal, said second signal and said peak signal are fed;

a second three-input "AND" circuit to which an inverted signal of said first signal, an inverted signal of said second signal and said peak signal are fed;

a third three-input "AND" circuit to which said first signal, the inverted signal of said second signal and said peak signal are fed;

a fourth three-input "AND" circuit to which the inverted signal of said first signal, said second signal and said peak signal are fed;

a first R-S flip-flop whose set terminal is connected to an output end of said first three-input "AND" circuit and whose reset terminal is connected to an output end of said first monostable circuit;

a second R-S flip-flop whose set terminal is connected to an output end of said second three-input "AND" circuit and whose reset terminal is connected to an output end of said first monostable circuit;

a third R-S flip-flop whose set terminal is connected to an output end of said third three-input "AND" circuit and whose reset terminal is connected to said first monostable circuit;

a fourth R-S flip-flop whose set terminal is connected to an output end of said fourth three-input "AND"

circuit and whose reset terminal is connected to an output end of said first monostable circuit;

a fifth "AND" circuit, having one input connected to an output of said first R-S flip-flop and another input connected to an output of said second R-S flip-flop;

a sixth "AND" circuit, having one input connected to an output of said third R-S flip-flop and another input connected to an output of said fourth R-S flip-flop;

a second monostable circuit for emitting a signal pulse signal in accordance with a rising edge of a signal emitted from said fifth "AND" circuit; and a third monostable circuit for emitting a signal pulse signal in accordance with a rising edge of a signal emitted from said sixth "AND" circuit.

8. An ignition timing control system as set forth in claim 7, wherein said engine condition detecting means comprises:

an amplifier for amplifying an output from said filter means;

a differentiation circuit for differentiating an output from said amplifier;

a comparator for emitting a signal which has a high level when the output from said differentiation circuit is positive and which has a low level when the output from said differentiation circuit is negative; and a detection pulse generator circuit for emitting a pulse signal which has a high level in accordance with a rise or a fall of an output from said comparator.

* * * * *